United States Patent
Suzuki et al.

(10) Patent No.: US 8,529,077 B2
(45) Date of Patent: Sep. 10, 2013

(54) ILLUMINATOR USING A COMBINATION OF PSEUDO-WHITE LED AND LENS SHEET

(75) Inventors: Shingo Suzuki, Kitasaku-gun (JP); Masaki Asai, Kitasaku-gun (JP)

(73) Assignee: Minebea Co., Ltd., Nagano (JP)

( * ) Notice: Subject to any disclaimer, the term of this patent is extended or adjusted under 35 U.S.C. 154(b) by 188 days.

(21) Appl. No.: 13/216,499

(22) Filed: Aug. 24, 2011

(65) Prior Publication Data
US 2013/0050978 A1    Feb. 28, 2013

(51) Int. Cl.
*F21V 9/16* (2006.01)
*F21V 7/00* (2006.01)

(52) U.S. Cl.
USPC ............. 362/84; 362/614; 362/620; 362/626

(58) Field of Classification Search
USPC ................... 362/84, 612, 614, 620, 621, 622, 362/626, 311.01, 297
See application file for complete search history.

(56) References Cited

U.S. PATENT DOCUMENTS

| 7,334,954 B1 * | 2/2008 | Rentz ............................. 401/202 |
| 7,445,358 B2 * | 11/2008 | Matsushita .................... 362/330 |
| 7,568,828 B2 * | 8/2009 | Chen et al. ..................... 362/626 |
| 7,690,810 B2 * | 4/2010 | Saitoh et al. ................... 362/246 |
| 8,376,601 B2 * | 2/2013 | Yashiro .......................... 362/606 |
| 2006/0104092 A1 * | 5/2006 | Feng et al. ...................... 362/626 |
| 2007/0285941 A1 * | 12/2007 | Ishihara et al. ............... 362/606 |

FOREIGN PATENT DOCUMENTS

JP    A-2002-221605    8/2002

* cited by examiner

*Primary Examiner* — John A Ward
(74) *Attorney, Agent, or Firm* — Oliff & Berridge, PLC

(57) ABSTRACT

There is provided an illuminator comprising: a light source that radially emits white lights in a forward direction; and a lens sheet that is arranged facing the light source and that has a plurality of prisms on one side thereof concentrically at an optical axis so as to control orientation of the white lights that are emitted from the light source, wherein the light source is composed of: a luminous element that emits lights with a predetermined wavelength; and a sealing body that covers the luminous element and that includes phosphors therewith, the phosphors being adapted to receive the lights with the predetermined wavelength which are emitted from the luminous element so as to emit fluorescence, and the lens sheet includes prisms that have focal distances each different from the prisms adjacent thereto.

12 Claims, 7 Drawing Sheets

F I G. 3 A
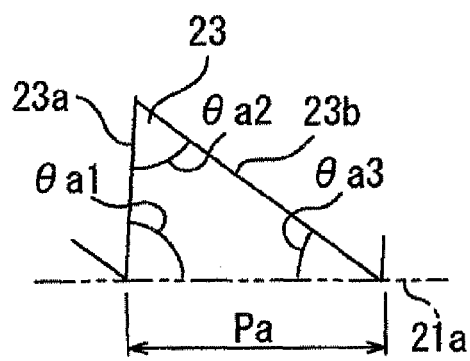
F I G. 3 B
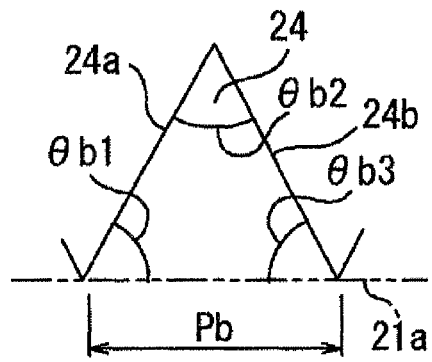

F I G. 4 A
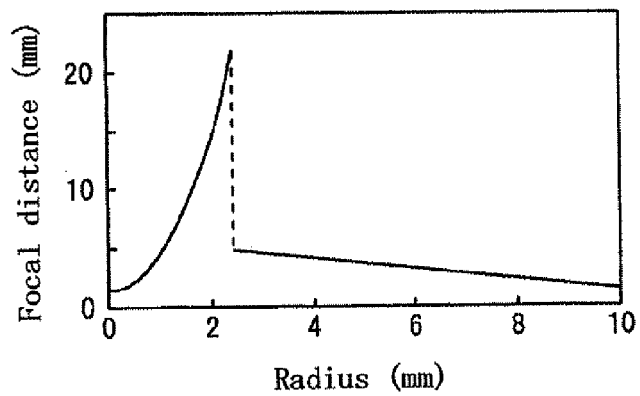
F I G. 4 B
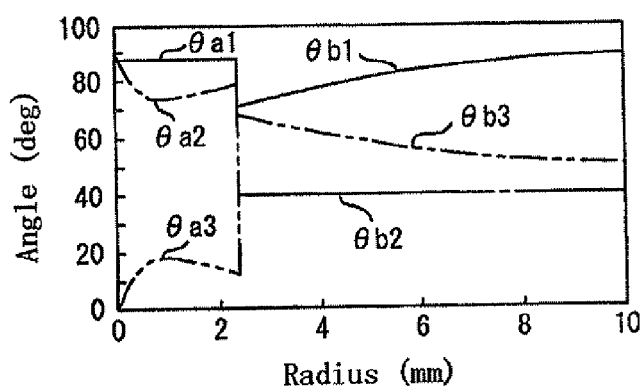
F I G. 4 C
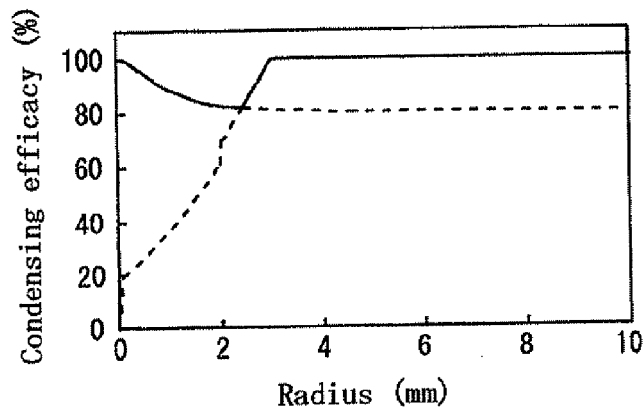

ILLUMINATOR USING A COMBINATION OF PSEUDO-WHITE LED AND LENS SHEET

BACKGROUND OF THE INVENTION

1. Field of the Invention

The present invention relates to an illuminator that is composed in combination of: a white light source and a sheet condensing lens.

2. Description of the Related Art

In a conventional illuminator that has been generally known, a sheet condensing lens such as a Fresnel lens (hereinafter referred to as the "lens sheet") is arranged in front of (or in an outgoing direction of) a light source, so that the orientation of outgoing lights is controlled contributing to a high illumination (or a high brightness). See, for example, Japanese Patent Application Laid-open No. 2002-221605 (hereinafter referred to as the "Patent Document").

Considering an illuminator disclosed in the Patent Document, as shown in FIG. 8, it is composed as that a lens sheet (a Fresnel lens) 72 is arranged in front of a linear light source 71 (or, at the upper portion of the FIG. 8). The lens sheet 72 has a plurality of refraction prisms (Fresnel lenses) at a center region thereof which is the side of an optical axis 73, the refraction prisms having refraction effects. On the other hand, at or near the outer circumference of the lens sheet 72, a plurality of reflection prisms (referred to as a TIR lens or a Total Internal Reflection lens) having reflection effects are formed.

As discussed hereinabove, since the lens sheet 72 has the refraction prisms at the center region thereof and the reflection prisms at the outer circumference region thereof, compared to the lens sheet where either the refraction prisms or the reflection prisms are individually used, it is possible to obtain luminous lights of high efficiencies due to high illuminations by having large intensified outgoing lights. Also, the intensity of the luminous lights is well homogenized. This is why outgoing lights that have been refracted by the refraction prisms tend to have a large intensity at the center of the lens sheet, but the intensity tends to decrease at the outer circumference of the lens sheet. On the contrary, the outgoing lights that have been reflected by the reflection prisms tend to have a small intensity at the center of the lens sheet, but the intensity tends to increase at the outer circumference of the lens sheet.

In recent years, there are notable demands on illuminators such as a downlight or a spotlight, which use a compact LED (Light Emitting Diode) with excellent environment compatibilities. Considering LEDs which supply white lights, a so-called pseudo-white LED has been widely used. This pseudo-white LED is composed of the following parts in combination: an LED chip that emits a blue-series light (the center wavelength of 410 nm to 480 nm); and a yellow phosphor that absorbs the blue-series light and converts the blue-series light into a yellow-series light (the wavelength range of 480 nm to 700 nm).

Here, the present inventors have constructed an illuminator by combining a pseudo-white LED of a surface mounting type and a lens sheet for a point light source (LED) disclosed by the Patent Document (see the section [0046]). With this illuminator the inventors could obtain luminous lights with a high illumination; however, the inventors observed color shadings in the luminous lights resulting in poor visibility. More specifically, the lights that have been passed through the lens sheet are recognizable as a white light as a whole; however, the lights become somewhat bluish at the center region of the lens sheet while the lights become somewhat yellowish at the outer circumference region of the lens sheet.

The cause of the color shadings will be explained as follows. As shown in FIG. 9, blue lights will be emitted from an LED chip 83 that is mounted on an electrode terminal 82 and that is placed on the bottom surface of the concave portion of a lamp house 81. Among the emitted blue lights, there are a light L1 travelling approximately parallel relative to an optical axis and a light L2 travelling in inclination relative to the optical axis. These lights L1 and light L2 have different optical path lengths, the optical path length being defined by light passing through a sealing body 85 including a plurality of yellow phosphors 84 therewith. To be more specific, the light L1 has a shorter optical path length than the light L2 (meaning that the light L1 has a shorter distance than the light L2 when passing through in the sealing body 85) whereby the light L1 has a relatively small ratio of being converted into a yellow light. The light L1 is thus a bluish white light. On the other hand, the light L2 has a longer optical path length than the light L1 (meaning that the light L2 has a longer distance than the light L1 when passing through in the sealing body 85) whereby the light L2 has a relatively large ratio of being converted into a yellow light. The light L2 is thus a yellowish white light.

SUMMARY OF THE INVENTION

The present invention has been made in light of the above-described circumstances, and it is an object of the present invention to provide an illuminator that has a high illumination and a high brightness and that can well reduce color shadings.

In order to achieve the object described above, according to a first aspect of the present invention, there is provided an illuminator comprising: a light source that radially emits white lights in a forward direction; and a lens sheet that is arranged facing the light source and that has a plurality of prisms on one side thereof concentrically at an optical axis so as to control orientation of the white lights that are emitted from the light source, wherein the light source is composed of: a luminous element that emits lights with a predetermined wavelength; and a sealing body that covers the luminous element and that includes phosphors therewith, the phosphors being adapted to receive the lights with the predetermined wavelength which are emitted from the luminous element so as to emit fluorescence, and the lens sheet includes prisms that have focal distances each different from the prisms adjacent thereto.

Considering the above embodiment in the present invention, the lens sheet that is arranged facing the white light source is constructed as that each prism adjacent to each other has a different focal distance. Here, light that is introduced into each of the prisms is guided in a forward direction with some inclinations relative to the optical axis at an angle according to the focal distance of each prism. Accordingly, each light introduced into each prism with a different focal distance will advance in such a manner as to cross (or mix) with each other. As a result, in case that light influenced by color shadings that has been emitted from the pseudo-white light source which is composed of the luminous element and the phosphors is introduced into the lens sheet, the light will be subjected to color mixture (or balancing) according to the size of the focal distance of each prism contributing to acquisition of luminous lights that have reduced color shadings.

In the first aspect of the present invention, the lens sheet may include an area in which a focal distance of the plurality of prisms is changed according to a distance from the optical axis.

Considering the above embodiment in the present invention, the focal distance of the plurality of prisms that are placed in a specific region is adapted to change according to distance from the optical axis whereby it becomes possible to not only dramatically reduce the color shadings but also to facilitate design and manufacture of the lens sheet.

In the first aspect of the present invention, it will be preferable that the plurality of prisms include: a plurality of refraction prisms that are formed at an area placed on a side of the optical axis, the refraction prisms having a refractive function; and a plurality of reflection prisms that are formed outside the area in which the refraction prisms are formed, the reflection prisms having a reflective function, wherein the plurality of refraction prisms are formed as that the more apart the refraction prisms become from the optical axis, the longer the focal distance thereof becomes relative to a distance between the light source and the lens sheet, and the plurality of the reflection prisms are formed as that the closer the reflection prisms become to the optical axis, the longer the focal distance thereof becomes relative to the distance between the light source and the lens sheet.

Considering the above embodiment in the present invention, the lens sheet has the refraction prisms at the center thereof (at an area around the optical axis) and has the plurality of reflection prisms having reflection function at the outer circumference portion thereof (at a region outside the area where the refraction prisms are provided). Accordingly, as explained in the related art, it can obtain a high efficient outgoing light with a well-homogenized intensity. Further, the plurality of refraction prisms are formed as that its focal distance becomes larger than the distance between the light source and the lens sheet as moving away from the optical axis. On the other hand, the plurality of reflection prisms are formed as that its focal distance becomes longer than the distance between the light source and the lens sheet as moving closer to the optical axis. This means that, all over the lens sheet, the focal distance of the prisms is changed for every area according to the distance from the optical axis. With this construction, it can further reduce the color shadings. Moreover, according to reason later explained, the present invention can provide more effective luminous light.

In the first aspect of the present invention, the lens sheet may have a flat surface thereon, the flat surface being placed between each of the prisms that is adjacent to each other.

Considering the above embodiment in the present invention, it is expected to further reduce the color shadings and to facilitate the design and manufacture of the lens sheet.

In the first aspect of the present invention, it is preferable that the light source is composed of: a blue light-emitting diode that emits a blue-series light; and a phosphor that receives the blue-series light and converts the blue-series light into a yellow-series light.

Considering the above embodiment in the present invention, it becomes possible to manufacture the illuminator having the above-explained advanced effects at a low cost.

BRIEF DESCRIPTION OF THE DRAWINGS

FIGS. 3A and 3B are sectional views that explain the contour of a prism on the lens sheet where FIG. 3A is a Fresnel prism, and FIG. 3B is a TIR prism;

FIGS. 4A to 4C are graphs that explain the specific structure and properties of the lens sheet where each of these FIGS. indicates the focal distance, angle and condensing efficacy of each prism;

DETAILED DESCRIPTION OF THE PREFERRED EMBODIMENTS

Preferred embodiments of an illuminator 10 according to the present invention will be described with reference to the accompanying drawings. Here, in each of the drawings, for making the present invention further understandable, some portions of the drawings may be typically expressed by exaggerating some structural elements. Accordingly, it may not accurately display actual dimensions, dimensional ratios or contours of the illuminator 10.

Figure 1:
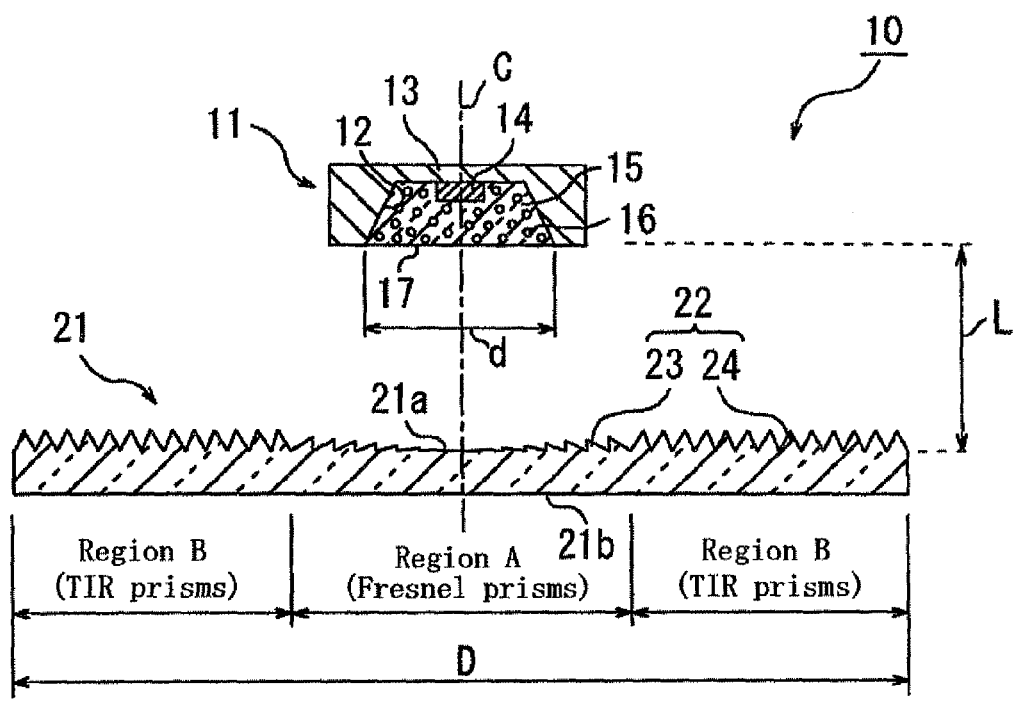
FIG. 1 is a sectional view that exemplifies the whole structure of an illuminator according to the embodiments of the present invention.

The illuminator 10 is, as shown in FIG. 1, composed of: an LED 11 as a light source that emit white lights in a forward direction (toward a bottom side in FIG. 1); a lens sheet 21 that is arranged facing the LED 11 and that controls the orientation of the white lights emitted from the LED 11; and a cup-shaped or a closed-end cylindrical reflective mirror (not shown) that covers the external marginal portion of both the LED 11 and the lens sheet 21 in whole.

The LED 11 is the pseudo-white LED that has been explained in the related art. In the present embodiment, the LED 11 is composed of: a white-resin made lamp house 13 that has a truncated cone concave portion 12 at its center; an LED chip 14 that is mounted at the bottom of the concave portion 12 and that emits blue lights; a sealing body 15 made of a transparent resin that is mounted on the concave portion 12 in such a manner as to cover the LED chip 14; and phosphors (YAG phosphor) 16 that are dispersed in the sealing body 15 and that receives blue lights emitted by the LED chip 14 so as to radiate yellow lights (fluorescence).

The sealing body 15 in which the phosphors 16 are dispersed is formed to be a truncated cone that gradually opens from the LED chip 14 toward the lens sheet 21. Accordingly, as explained in the related art, among lights that are radially emitted from a luminous surface 17, which is the opening of the lamp house 13, lights emitted approximately parallel relative to an optical axis (center axis) C tend to be somewhat bluish white lights. On the other hand, lights that are emitted with inclination relative to the optical axis C tend to be somewhat yellowish white lights.

Next, as to the lens sheet 21, which is the main feature of the present invention, it is made of a transparent resin (in the present invention, acrylic resin with the refraction index of 1.49) and formed into a disk shape with the diameter of D (in the present invention, through an injection molding). The lens sheet 21 is arranged so as to correspond its rotation center to the optical axis C, so that a distance between a surface facing the LED 11 (hereinafter referred to as the "facing surface 21a") and the luminous surface 17 of the LED 11 becomes a predetermined distance L (hereinafter referred to as the "LED-Sheet distance L").

In the embodiments of the present invention, the LED-Sheet distance L is made approximately correspondent to a diameter d of the luminous surface 17 of the LED 11; however, in order to fully enjoy later-explained functional effects of the present embodiments regardless of contours (small or thin), it would be preferable that the distance L between the LED and the lens sheet 21 is set to be 0.5 to 1.5 times as long as the diameter d. Further, as the same reason, it is preferable that a diameter D of the lens sheet 21 is set to $TAN^{-1}$ (D/2L) <80°.

At the facing surface 21a of the lens sheet 21, a plurality of prisms 22 that are concentric relative to the optical axis C are provided. The plurality of prisms 22 are, as same with the related art, composed of: a plurality of (for convenience, m pieces of) refraction prisms (hereinafter referred to as the "Fresnel prisms") 23 formed at a region A at the side of the optical axis C; and a plurality of (as the same, n pieces of) reflection prisms (hereinafter referred to as the "TIR prisms") 24 formed at regions B that are radially outside the region A. With this structure, luminous lights with a high illuminance can be emitted from an exit surface 21b (the surface opposite to the facing surface 21a) of the lens sheet 21. Here, a boundary between the Fresnel prism 23 and the TIR prism 24 can be determined by selecting either the Fresnel prism 23 or the TIR prism 24 that has more effective lights in ratio.

Figure 2:
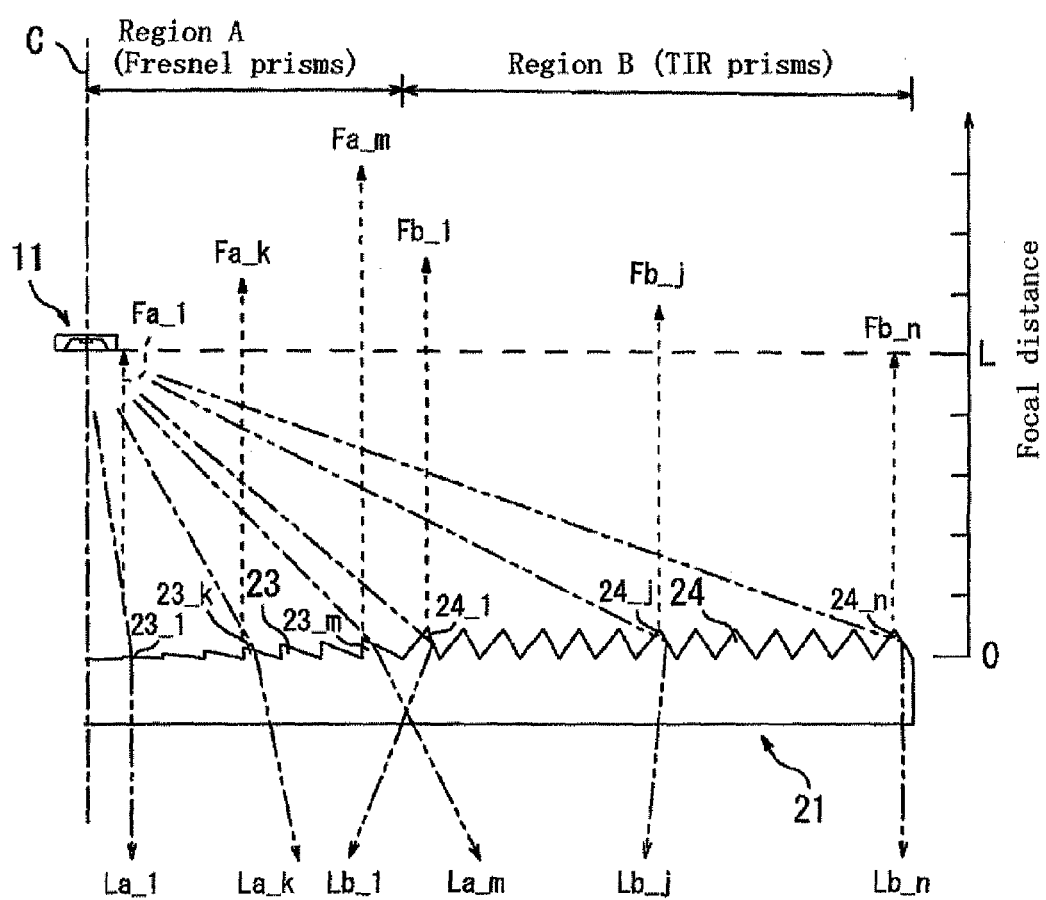
FIG. 2 is a right-half sectional view relative to an optical axis that explains the structure of a lens sheet and outgoing lights of the illuminator (hatching omitted)

The plurality of (m+n pieces of) prisms 22 are, as indicated by ordinate axes in FIG. 2, formed as that the focal distance F of the prisms 22 is continuously changed according to a distance from the optical axis C in each of the regions A and B. Here, the focal distance of the Fresnel prisms 23 is indicated by Fa, and the focal distance of the TIR prisms 24 is indicated by Fb. In the identical prisms 22, the focal distance F becomes constant regardless of a position in the circumferential position of the prisms 22.

Considering the focal distance Fa of the Fresnel prisms 23, the focal distance Fa_1 of a first Fresnel prism 23_1 that is placed in the most inside in a radial direction is made correspondent with the LED-Sheet distance L. Here, a flat surface portion exists more inside the Fresnel prism 23_1. This flat surface may be considered as a first Fresnel prism. As to the plurality of Fresnel prisms 23 besides the first Fresnel prism 23_1, the focal distance Fa will be continuously larger as moving toward outside in a radial direction. This will be discussed with reference to FIG. 2. Starting from the most inside in a radial direction, the Fresnel prisms are designated as 23_1, 23_k, and 23_m (23_m will be the most outside in a radial direction). In this condition, each of the focal distances Fa_1, Fa_k, and Fa_m respectively corresponding to the Fresnel prisms 23_1, 23_k, and 23_m are determined in the following relation.

$$L=Fa\_1<Fa\_k<Fa\_m$$

By setting the focal distance Fa of each of the Fresnel prisms 23, light La_1 that passes through the Fresnel prism 23_1 placed the most inside in a radial direction will advance approximately parallel to the optical axis C. On the other hand, lights La (La_k, La_m) that pass the Fresnel prism 23 (for example, the Fresnel prisms 23_k, 23_m) placed more outside in a radial direction relative to the Fresnel prism 23_1 will advance with an inclination toward outside relative to the optical axis C. The inclination tends to become larger as the Fresnel prisms 23 are placed away from the Fresnel prism 23_1 in a radial direction.

Next, as to the focal distance Fb on the TIR prisms 24, a focal distance Fb_n of a TIR prism 24_n placed n pieces or the most outside in a radial direction is made correspondent with the LED-Sheet distance L. In the plurality of TIR prisms 24 placed inside the TIR prism 24_n in a radial direction, a focal distance Fb will be continuously larger as moving inside in a radial direction. This means that the more away from a TIR prism 24_1 toward the 24_n, the smaller the focal distance Fb continuously becomes. This will be discussed in more detail with reference to FIG. 2. TIR prisms 24_1, 24_j, and 24_n are arranged in order. The TIR prism 24_1 is placed the most inside in a radial direction while the TIR prism 24_n is placed the most outside in a radial direction. Focal distances Fb_1, Fb_j, and Fb_n respectively corresponding to the TIR prisms 24_1, 24_j, and 24_n can be determined in the following relation.

$$Fb\_1>Fb\_j>Fb\_n=L$$

By setting the focal distance Fb of each of the TIR prisms 24, light Lb_n that passes through the TIR prism 24_n placed the most outside in a radial direction will advance approximately parallel to the optical axis C. On the other hand, lights Lb (Lb_1, La_j) that pass the TIR prisms 24 (for example, the TIR prisms 24_1, 24_j) placed more inside in a radial direction than the 24_n will advance with an inclination toward inside relative to the optical axis C. The inclination tends to become larger as the TIR prisms 24 move toward the TIR prism 24_1 in a radial direction.

Hereinafter, a specific contour of each of the prisms 22 and a specific method that changes the focal distance F will be discussed with reference to FIGS. 3A and 3B.

Each of the Fresnel prisms 23 is, as shown in FIG. 3A, formed into a triangular contour in section, and composed of a first Fresnel surface 23a that is placed inside in a radial direction and approximately parallel to the optical axis C; a second Fresnel surface 23b that is placed outside in a radial direction and that has an inclination relative to the optical axis C; and a part of the facing surface 21a which is orthogonal to the optical axis C. A pitch Pa is constant (50 μm in this embodiment) regardless of prisms (meaning without depending on the distance from the optical axis C). The pitch Pa will be correspondent with the width of each prism in this embodiment. Here, an angle defined by the first Fresnel surface 23a and the facing surface 21a is set to θa1 (hereinafter referred to as the "first Fresnel surface inclined angle"). An angle defined by the first Fresnel surface 23a and a second Fresnel surface 23b is set to θa2 (hereinafter referred to as the "Fresnel apical angle"). An angle defined by the second Fresnel surface 23b and the facing surface 21a is set to θa3 (hereinafter referred to as the "second Fresnel surface inclined angle").

In the case of the Fresnel prism 23, the light La that has been emitted from the LED 11 is refracted when introduced into the second Fresnel surface 23b. The light La then exits out in a forward direction from the exit surface 21b of the lens sheet 21. Accordingly, in a condition that the inclined angle θa1 of the first Fresnel surface and the pitch Pa are constant, by changing the Fresnel apical angle θa2 and the second Fresnel surface inclined angle θa3, the focal distance Fa of each of the Fresnel prisms 23 can be adjusted.

On the other hand, each of the TIR prisms 24 is, as shown in FIG. 3B, formed into a triangular contour in section, and composed of: a first TIR surface 24a that is placed inside in a radial direction and inclined relative to the optical axis C; a second TIR surface 24b that is placed outside in a radial direction and inclined relative to the optical axis C; and a part of the facing surface 21a that is orthogonal to the optical axis C. A pitch Pb is constant regardless of the prisms (50 μm in the present embodiment). Here, an angle defined by the first TIR surface 24a and the facing surface 21a (hereinafter referred to as the "first TIR surface inclined angle") is set to θb1. An angle defined by the first TIR surface 24a and a second TIR surface 24b (hereinafter referred to as the "TIR apical angle") is set to θb2. An angle defined by the second TIR surface 24b and the facing surface 21a (hereinafter referred to as the "second TIR surface inclined angle") is set to θb3.

In the case of the TIR prisms 24, the light Lb emitted form the LED 11 will be introduced into the TIR prisms 24 while being refracted on the first TIR surface 24a. The light Lb is then reflected on the second TIR surface 24b, and exits out in a forward direction from the exit surface 21b of the lens sheet 21. Thus, basically, by changing the TIR apical angle θb2 and the second TIR surface inclined angle θb3, it becomes possible to adjust the focal distance Fb of each of the TIR prisms 24. In the present embodiments, in consideration of operationability of manufacturing the molding die for the TIR prisms 24, the TIR apical angle θb2 (corresponding to the top edge angle of a cutting tool) is set to be constant. That is, the value of the first TIR surface inclined angle θb1 is changed according to the value of the second TIR surface inclined angle θb3.

Next, operational effects of the illuminator 10 structured as above will be discussed hereinbelow, As a light source, the illuminator 10 uses the LED 11, the LED 11 being able to emit white lights by the following parts in combination: the LED chip 14 emitting blue lights; and the phosphor 16 that receives the blue lights so as to emit yellow lights. Further, the lens sheet 21 is arranged facing the LED 11 with the LED-Sheet distance L. The lens sheet 21 has the plurality of Fresnel prisms 23 at the region A placed at center of the lens sheet 21, and has the plurality of TIR prisms 24 at the regions B placed radially outside the region A. With this structure, as the same with the conventional art, white lights emitted from the LED 11 are allowed to exit out from the whole area of the exit surface 21b of the lens sheet 21 in an effective manner. As a result, the illuminator 10 with a high illuminance can be realized.

As to the Fresnel prisms 23, the focal distance Fa_1 of the Fresnel prism 23_1 placed the most inside in a radial direction is made correspondent to the LED-Sheet distance L. Further, the Fresnel prisms 23 are formed as that the more away from the optical axis C, the longer the focal distance Fa continuously becomes than the LED-Sheet distance L. On the other hand, in the TIR prisms 24, the focal distance Fb_n of the TIR prism 24_n that is placed the most outside in a radial direction is made correspondent to the LED-Sheet distance L. The TIR prisms 24 are then formed as that the more coming toward the optical axis C, the longer the focal distance Fb continuously becomes than the LED-Sheet distance L.

With this structure, lights emitted in a forward direction from the most inside portion of the lens sheet 21 (that is, the Fresnel prism 23_1 and its surrounding) and the most outside portion of the lens sheet 21 (the TIR prism 24_n and its surrounding) will advance approximately parallel to the optical axis C. Here, lights introduced into the region A of the Fresnel prisms 23 (except an area placed at the most inside in a radial direction) will advance with an inclination to outside in a radial direction at variable angles relative to the optical axis C depending on a position into which lights are introduced. Here, the region A except the area placed at the most inside in a radial direction as discussed above will be referred to as the "inner peripheral side area" when appropriate. On the other hand, lights introduced into the region B of the TIR prisms 24 (except an area placed at the most outside in a radial direction) will advance with an inclination to inside in a radial direction at variable angles relative to the optical axis C depending on a position into which lights are introduced. Here, the region B except the area placed at the most outside in a radial direction as discussed above will be referred to as the "outer peripheral side area" when appropriate. That is, when observing all of the lights emitted from the lens sheet 21, the lights emitted from the inner peripheral side area and the lights emitted from the outer peripheral side area will advance forward while being mixed to each other.

As discussed hereinbefore, among lights radially emitted from the LED 11 toward the lens sheet 21, lights emitted approximately parallel to the optical axis C will be bluish white lights while lights emitted with an inclination relative to the optical axis C will be yellowish white light. As said, among lights emitted from the lens sheet 21, lights emitted from the inner peripheral side area and the outer peripheral side area are adapted to advance while being mixed to each other. Accordingly, by mixing the bluish white lights mainly introduced into the inner peripheral side area and the yellowish white lights mainly introduced into the outer peripheral side area, color shadings which have been considered as notable problems can be remarkably reduced.

Figure 5A:
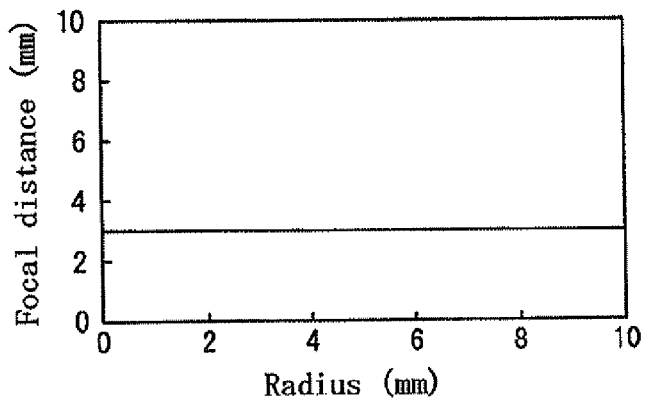
FIGS. 5A to 5C are graphs that explain the structure of a conventional lens sheet in comparison with the above FIG. 4 where each of these FIGS. indicates the focal distance, angle and condensing efficacy of each prism.
Figure 5B:
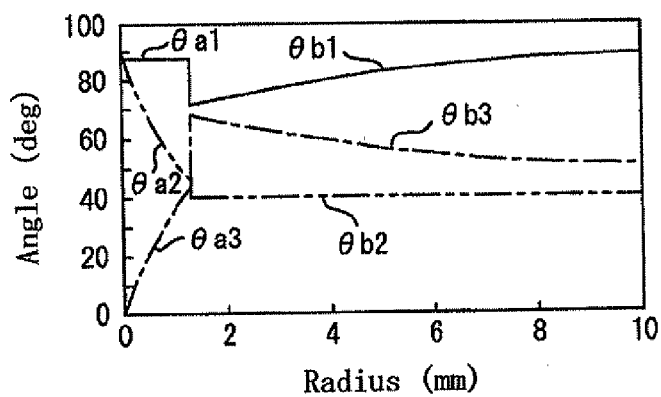
Figure 5C:
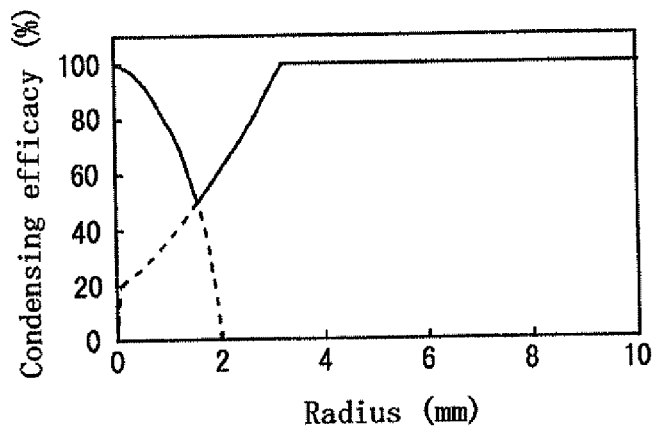

Next, in order to make the illuminator 10 according to the present embodiment further understood, the specific structure of the lens sheet 21 (hereinafter referred to as the "the present items") will be explained with reference to FIGS. 4A to 4C. Here, as a comparison, conventional structures (hereinafter referred to as the "comparison items") are shown in FIGS. 5A to 5C. In both the present items and the comparison items, they have the LED-Sheet distance of 3 mm, and have the diameter of the lens sheet of 20 mm. The diameter of an emitting surface of the LED is 4.3 mm.

In the comparison items, as shown in FIG. 5A, regardless of the Fresnel prisms or the TIR prisms, both prisms have the constant focal distance of 3 mm (identical with the LED-sheet distance). On the contrary, in the present items, as shown in FIG. 4A, considering the focal distance of the Fresnel prisms, its focal distance at the inner peripheral side area is set to approximately 3 mm. However, as moving toward outside in a radial direction, the focal distance is designed to increase in an ascending ratio. Further, in the focal distance of the TIR prisms, it is designed to gradually increase in a constant ratio as moving toward inside in a radial direction. The focal distance of the TIR prisms that are placed at the most inside area (the area with the radius of 2.4 mm which is a boundary to the Fresnel prism) is 5 mm. In order to realize the focal distance that is continuously changed in a radial direction (or according to the distance from the optical axis) for each region, the angle of each prism is individually set to the values shown in FIG. 4B. Here, the boundary between the Fresnel prisms and the TIR prisms in the comparison items will be a point where its radius is approximately 1.6 mm.

In the present invention, the illuminator 10 is completed by combining the lens sheet and the pseudo-white LED that are structured as discussed hereinabove. Compared with the comparison items, it could reduce color shadings up to the level that can not be actually observed.

Further, as can be understood by comparing FIG. 4C and FIG. 5C, by continuously changing the focal distance of each prism (especially the Fresnel prisms) in a radial direction, it can be said that the condensing efficacy of light is further improved. Considering the Fresnel prisms, the condensing efficacy shown in FIGS. 4C and 5C means the ratio of lights introduced into the second Fresnel surface among lights introduced into each of the Fresnel prisms (meaning the first Fresnel surface and the second Fresnel surface) from the LED. Further, in the case of the TIR prisms, among lights introduced into each of the TIR prisms from the LED, it is the ratio of lights that are introduced into the second TIR surface and that are reflected. That is, it means that the larger the condensing efficacy is, the more effective light intensities it has as luminous lights.

Figure 6A:
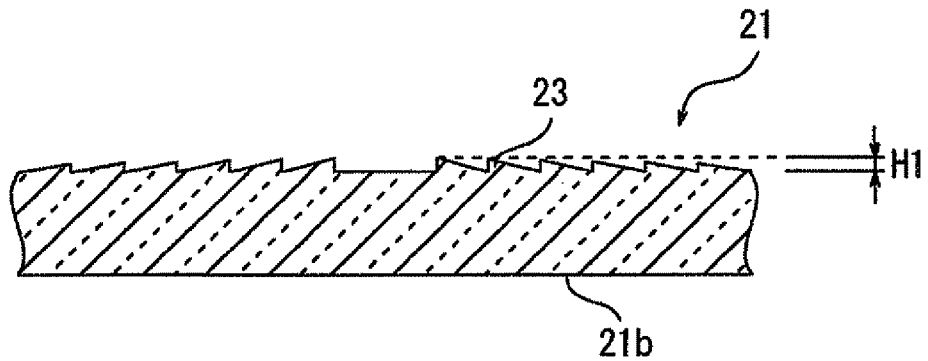
FIG. 6A is a partial sectional view that shows the structure of a plurality of Fresnel prisms of the lens sheet.

In the present invention, the focal distance of the Fresnel prism is made continuously increased in a radial direction. The reason of that the condensing efficacy is improved will be discussed hereinbelow. When comparing FIG. 4B and FIG. 5B, in the comparison items, $\theta a2$ of its Fresnel apical angle is made continuously decreased in a radial direction (the inclined angle $\theta a3$ is increased). On the other hand, in the present invention, it indicates a specific property as that its Fresnel apical angle $\theta a2$ is inflected around 0.7 mm in radius. This specific property reflects the height of each of the Fresnel prisms. In the present items, as shown in FIG. 6A, the height H1 of each Fresnel prism is approximately constant through its radial direction with relatively low values (meaning that the height H1 is flatter than the height H2 of the comparison items as further explained hereinbelow). Specifically, the area of the first Fresnel surface is made approximately constant throughout the radial direction.

Figure 6B:
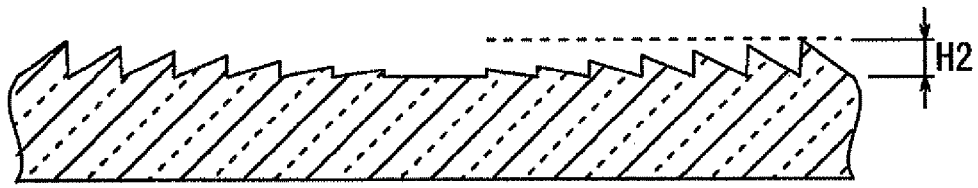
FIG. 6B is a partial sectional view that shows the structure of a plurality of Fresnel prisms on a conventional lens sheet for the purpose of comparison.

On the contrary, in the comparison items as shown in FIG. 6B, the height H2 of the Fresnel prisms becomes increased as moving toward outside in a radial direction (H2>H1). This means that the area of the first Fresnel surface is made increased. Here, since lights that are introduced into the first Fresnel surface will become basically extraneous (meaning not contributing for illuminance), the condensing efficacy of lights accordingly deteriorates at the outer circumference where the area of the first Fresnel surface becomes increased. In the present items compared to the comparison items, it can reduce increase of the area of the first Fresnel surface at the outside thereby contributing to the high efficacy of lights.

Based on the reason discussed hereinabove, by applying the lens sheet 21 according to the embodiments of the present invention, even if pseudo-white LEDs are used as a light source, it can actualize the illuminator with less color shadings and further effective illuminance.

The preferable embodiments of the present invention have been discussed hereinabove; however, the present invention is not limited thereto. The present invention allows variable modifications as long as they do not deviate from the intent of the present invention.

For example, in the above preferable embodiments, the focal distance F of each of the prisms 22 is continuously changed in a radial direction for each Fresnel prism 23 as well as for each TIR prism 24. The present invention is, however, not limited to this embodiment. In the present invention, for example, it can change the focal distance F of the prisms optionally selected from the plurality of the prisms 22, or randomly vary the focal distance F of all prisms in the plurality of the prisms 22. When structured in this way, the color shadings of lights can be reduced as the same with the preferable embodiments.

Further, as to the Fresnel prisms 23 and the TIR prisms 24 of the present invention, the focal distance of each of the prisms 22 is made either increased or decreased in one direction in a radial direction. The present invention is, however, not limited to this embodiment. In the present invention, according to the condition of chromaticity distributions of lights emitted from the LED 11, it would be possible, for example, to have the following area in combination within each region A and region B: 1) a partial area where the focal distance F is increased; 2) a partial area where the focal distance F is decreased; and 3) a partial area where the focal distance F is constant (meaning the partial area where adjacent prisms have the same focal distance).

Still further, in the above preferable embodiments, the focal distance F of both the Fresnel prism 23_1 (the most inside prism in a radial direction) and the TIR prism 24_n (the most outside prism in a radial direction) of the lens sheet 21 are approximately correspondent with the LED-Sheet distance L. The present invention is, however, not limited to this embodiment. It can set the focal distance F of the Fresnel prism 23_1 and the TIR prism 24_n different from the LED-Sheet distance L according to the orientation properties of outgoing lights to be required.

Figure 7:
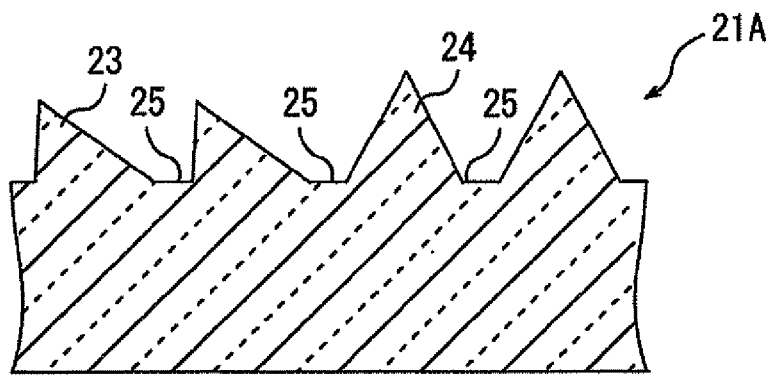
FIG. 7 is a partial sectional view the shows the modified example of the lens sheet.
Figure 8:
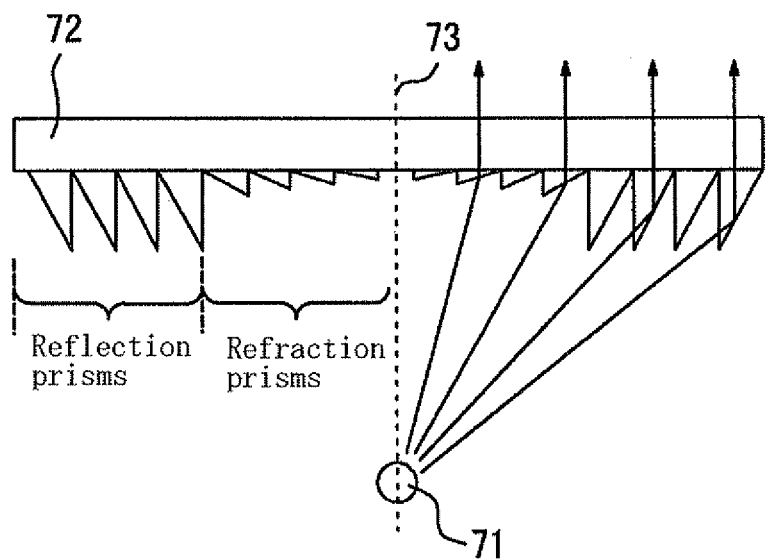
FIG. 8 is a sectional view that explains the structure of a conventional Fresnel lens and outgoing lights (hatching omitted)
Figure 9:
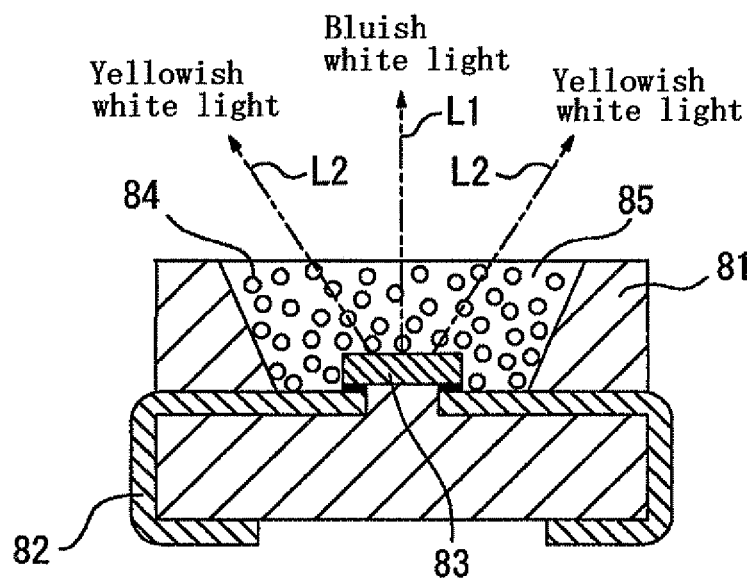
FIG. 9 is a sectional view that explains the structure of a pseudo-white LED and outgoing lights.

Yet further, in the above preferable embodiments, each of the prisms 23, 24 is arranged to each other with no space therebetween. The present invention is, however, not limited to this embodiment. For example, as a lens sheet 21A shown in FIG. 7, it can have a flat surface 25 between each of the prisms 23 and the prisms 24 adjacent to each other, the flat surface 25 being orthogonal to the optical axis C. Even if the flat surface 25 is formed as above, it can reduce color shadings and increase condensing efficacies thus contributing to facilitation of manufacturing the lens sheet.

Moreover, in the above preferable embodiments, the pseudo-white LED 11 is applied as a light source. However, the present invention allows that the other types of light sources are combined with the lens sheet. Also in this embodiment, the reduction of color shadings and the improvement of illuminance are expected.

In addition, in the above preferable embodiments, on the lens sheet 21, the Fresnel prisms 23 and the TIR prisms 24 are formed. However, for example, in case that light sources with a relatively high directivity (meaning a small radiation angle) are applied, it is possible that only Fresnel prisms 23 are formed on the lens sheet 21. In this case also, it is possible to have the reduction of color shadings and the improvement of illuminance.

Lastly, in the above preferable embodiments, the phosphors 16 are dispersively formed in the sealing body 15 in order to receive blue lights emitted by the LED chip 14 so as to radiate yellow fluorescent lights. However, the present invention is not limited to this embodiment. The sealing body 15 may not have the phosphors 16 therein. Instead, the phosphors 16 may be directly laminated on the LED chip 14.

What is claimed is:

1. An illuminator comprising:
 a light source that radially emits white lights in a forward direction; and
 a lens sheet that is arranged facing the light source and that has a plurality of prisms on one side thereof concentrically at an optical axis so as to control orientation of the white lights that are emitted from the light source,
 wherein the light source is composed of: a luminous element that emits lights with a predetermined wavelength; and a sealing body that covers the luminous element and that includes phosphors therewith, the phosphors being adapted to receive the lights with the predetermined wavelength which are emitted from the luminous element so as to emit fluorescence, and
 the lens sheet includes prisms that have focal distances each different from the prisms adjacent thereto.

2. The illuminator according to claim 1, wherein the lens sheet includes an area in which a focal distance of the plurality of prisms is changed according to a distance from the optical axis.

3. The illuminator according to claim 2, wherein the plurality of prisms include:
   a plurality of refraction prisms that are formed at an area placed on a side of the optical axis, the refraction prisms having a refractive function; and
   a plurality of reflection prisms that are formed outside the area in which the refraction prisms are formed, the reflection prisms having a reflective function, wherein
   the plurality of refraction prisms are formed as that the more apart the refraction prisms become from the optical axis, the longer the focal distance thereof becomes relative to a distance between the light source and the lens sheet, and
   the plurality of the reflection prisms are formed as that the closer the reflection prisms become to the optical axis, the longer the focal distance thereof becomes relative to the distance between the light source and the lens sheet.

4. The illuminator according to claim 3, wherein the lens sheet has a flat surface thereon, the flat surface being placed between each of the plurality of prisms that is adjacent to each other.

5. The illuminator according to claim 4, wherein the lens sheet has a flat surface thereon, the flat surface being placed between each of the plurality of prisms that is adjacent to each other.

6. The illuminator according to claim 2, wherein the lens sheet has a flat surface thereon, the flat surface being placed between each of the plurality of prisms that is adjacent to each other.

7. The illuminator according to claim 6, wherein the lens sheet has a flat surface thereon, the flat surface being placed between each of the plurality of prisms that is adjacent to each other.

8. The illuminator according to claim 2, wherein the light source is composed of: a blue light-emitting diode that emits a blue-series light; and a phosphor that receives the blue-series light and converts the blue-series light into a yellow-series light.

9. The illuminator according to claim 3, wherein the light source is composed of: a blue light-emitting diode that emits a blue-series light; and a phosphor that receives the blue-series light and converts the blue-series light into a yellow-series light.

10. The illuminator according to claim 1, wherein the lens sheet has a flat surface thereon, the flat surface being placed between each of the plurality of prisms that is adjacent to each other.

11. The illuminator according to claim 10, wherein the light source is composed of: a blue light-emitting diode that emits a blue-series light; and a phosphor that receives the blue-series light and converts the blue-series light into a yellow-series light.

12. The illuminator according to claim 1, wherein the light source is composed of: a blue light-emitting diode that emits a blue-series light; and a phosphor that receives the blue-series light and converts the blue-series light into a yellow-series light.

* * * * *